United States Patent
Park et al.

(10) Patent No.: US 9,258,574 B2
(45) Date of Patent: Feb. 9, 2016

(54) FILTERING METHOD FOR REMOVING BLOCK ARTIFACTS AND/OR RINGING NOISE AND APPARATUS THEREFOR

(71) Applicant: SAMSUNG ELECTRONICS CO., LTD., Suwon-si (KR)

(72) Inventors: Jeong-Hoon Park, Seoul (KR); Yong-je Kim, Yongin-si (KR); Yung-lyul Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/609,158

(22) Filed: Jan. 29, 2015

(65) Prior Publication Data

US 2015/0146105 A1    May 28, 2015

Related U.S. Application Data

(63) Continuation of application No. 13/908,723, filed on Jun. 3, 2013, now Pat. No. 9,060,105, which is a continuation of application No. 13/487,485, filed on Jun. 4, 2012, now Pat. No. 8,457,438, which is a continuation of application No. 11/750,772, filed on May 18, 2007, now Pat. No. 8,208,749, which is a continuation of application No. 10/354,164, filed on Jan. 30, 2003, now Pat. No. 7,561,623.

(30) Foreign Application Priority Data

Jan. 31, 2002   (KR) .................. 10-2002-0005742
Sep. 2, 2002   (KR) .................. 10-2002-0052457

(51) Int. Cl.
   *G06K 9/40*      (2006.01)
   *H04N 19/86*    (2014.01)
   (Continued)

(52) U.S. Cl.
   CPC ........ *H04N 19/86* (2014.11); *G06T 5/00* (2013.01); *G06T 5/50* (2013.01); *G06T 7/0002* (2013.01); *H04N 1/38* (2013.01); *H04N 5/213* (2013.01); *H04N 19/00* (2013.01); *H04N 19/117* (2014.11); *H04N 19/124* (2014.11); *H04N 19/137* (2014.11); *H04N 19/14* (2014.11);
   (Continued)

(58) Field of Classification Search
   None
   See application file for complete search history.

(56) References Cited

U.S. PATENT DOCUMENTS 4,941,043 A    7/1990   Jass
5,126,841 A *  6/1992   Tanaka et al. ............ 375/240.16
(Continued)

FOREIGN PATENT DOCUMENTS

CN    1170318 A    1/1998
CN    1264482 A    8/2000
(Continued)

OTHER PUBLICATIONS

Atzori L et al.: "Low-complexity post-processing for artifact reduction in block-DCT based video coding", ICIP 2000, vol. 2, Sep. 10, 2000, pp. 668-671.
(Continued)

*Primary Examiner* — Thomas Conway
(74) *Attorney, Agent, or Firm* — Sughrue Mion, PLLC

(57) ABSTRACT

Provided are a filtering method and apparatus for removing blocking artifacts and ringing noise. The filtering method includes transforming video data on a block-by-block basis, and detecting the presence of an edge region in the video data by checking the distribution of values obtained by the transformation. Accordingly, it is possible to completely remove blocking artifacts and/or ringing noise by more effectively detecting the presence of an edge region in video data.

3 Claims, 9 Drawing Sheets

(51) Int. Cl.

| | | |
|---|---|---|
| *H04N 5/213* | (2006.01) | |
| *H04N 19/176* | (2014.01) | |
| *H04N 19/61* | (2014.01) | |
| *H04N 19/117* | (2014.01) | |
| *H04N 19/14* | (2014.01) | |
| *H04N 19/18* | (2014.01) | |
| *H04N 19/82* | (2014.01) | |
| *H04N 19/137* | (2014.01) | |
| *H04N 19/895* | (2014.01) | |
| *G06T 5/50* | (2006.01) | |
| *G06T 7/00* | (2006.01) | |
| *H04N 19/60* | (2014.01) | |
| *G06T 5/00* | (2006.01) | |
| *H04N 1/38* | (2006.01) | |
| *H04N 19/00* | (2014.01) | |
| *H04N 19/124* | (2014.01) | |
| *H04N 19/164* | (2014.01) | |
| *H04N 19/625* | (2014.01) | |
| *H04N 19/80* | (2014.01) | |

(52) U.S. Cl.
CPC .......... *H04N 19/164* (2014.11); *H04N 19/176* (2014.11); *H04N 19/18* (2014.11); *H04N 19/60* (2014.11); *H04N 19/61* (2014.11); *H04N 19/625* (2014.11); *H04N 19/80* (2014.11); *H04N 19/82* (2014.11); *H04N 19/895* (2014.11)

(56) References Cited

U.S. PATENT DOCUMENTS

| | | | |
|---|---|---|---|
| 5,128,757 A | | 7/1992 | Citta et al. |
| 5,475,434 A | | 12/1995 | Kim |
| 5,610,729 A | | 3/1997 | Nakajima |
| 5,787,207 A | | 7/1998 | Golin |
| 5,883,983 A | | 3/1999 | Lee et al. |
| 5,920,356 A | | 7/1999 | Gupta et al. |
| 5,974,197 A | | 10/1999 | Lee et al. |
| 6,175,593 B1 | | 1/2001 | Kim et al. |
| 6,188,799 B1 | * | 2/2001 | Tan et al. .................. 382/260 |
| 6,215,425 B1 | | 4/2001 | Andrews et al. |
| 6,240,135 B1 | | 5/2001 | Kim |
| 6,292,512 B1 | | 9/2001 | Radha et al. |
| 6,539,060 B1 | | 3/2003 | Lee et al. |
| 6,665,346 B1 | * | 12/2003 | Lee et al. ................ 375/240.29 |
| 6,983,079 B2 | | 1/2006 | Kim |
| 7,035,471 B2 | | 4/2006 | Kondo et al. |
| 7,120,197 B2 | * | 10/2006 | Lin et al. ................ 375/240.29 |
| 7,145,953 B2 | * | 12/2006 | Park et al. ................ 375/240.2 |
| 7,272,186 B2 | | 9/2007 | Hong |
| 7,319,415 B2 | | 1/2008 | Gomila |
| 2001/0003545 A1 | | 6/2001 | Hong |
| 2001/0019634 A1 | | 9/2001 | Lainema et al. |
| 2001/0020906 A1 | | 9/2001 | Andrews et al. |
| 2003/0128213 A1 | | 7/2003 | Jun et al. |
| 2003/0219073 A1 | | 11/2003 | Lee et al. |
| 2007/0098077 A1 | | 5/2007 | Sun et al. |
| 2007/0110152 A1 | | 5/2007 | Lee et al. |
| 2007/0223833 A1 | | 9/2007 | Park et al. |
| 2007/0269128 A1 | | 11/2007 | Park et al. |

FOREIGN PATENT DOCUMENTS

| | | |
|---|---|---|
| EP | 0817497 A2 | 1/1998 |
| EP | 1032217 A2 | 8/2000 |
| JP | 10-66090 A | 3/1998 |
| JP | 10-0243225 B1 | 11/1999 |
| JP | 2001-510952 A | 8/2001 |
| JP | 2001-522172 A | 11/2001 |

OTHER PUBLICATIONS

Tong H H Y et al.: "A perceptual model for JPEG applications based on block classification, texture masking, and luminance masking", Image Processing, 1998. ICIP 98. Proceedings. 1998 International Conference on Chicago, IL, USA, Oct. 4, 1998, pp. 428-432.
Communication, dated Jul. 2, 2013, issued by the European Patent Office in counterpart European Patent Application No. 03250529.9.
Communication from the Indian Patent Office issued Apr. 15, 2014 in a counterpart Indian Application No. 3/DEL/2003.
Communication dated Aug. 12, 2008 issued by the Japanese Patent Office in counterpart Japanese Patent Application No. 2008-162510.

* cited by examiner

4x4 PIXEL BLOCK     4x4 QUANTIZATION DCT BLOCK

| A | B | B | B |
|---|---|---|---|
| C |   |   |   |
| C |   |   |   |
| C |   |   |   |

4x4 QUANTIZATION DCT BLOCK

FILTERING METHOD FOR REMOVING BLOCK ARTIFACTS AND/OR RINGING NOISE AND APPARATUS THEREFOR

CROSS REFERENCE TO RELATED APPLICATION

This application is a continuation application of U.S. patent application Ser. No. 13/908,723, filed on Jun. 3, 2013, in the U.S. Patent and Trademark Office, which is a continuation application of U.S. patent application Ser. No. 13/487,485, filed Jun. 4, 2012, in the U.S. Patent and Trademark Office, (now U.S. Pat. No. 8,457,438, issued Jun. 4, 2013), which is a continuation application of U.S. patent application Ser. No. 11/750,772, filed on May 18, 2007, in the U.S. Patent and Trademark Office, (now U.S. Pat. No. 8,208,749, issued Jun. 26, 2012), which is a continuation application of U.S. patent application Ser. No. 10/354,164, filed on Jan. 30, 2003, in the U.S. Patent and Trademark Office, (now U.S. Pat. No. 7,561,623, issued Jul. 14, 2009), which claims the priority from Korean Patent Application Nos. 10-2002-0005742 and 10-2002-0052457, filed Jan. 31, and Sep. 2, 2002, respectively, in the Korean Intellectual Property Office. The disclosures of the prior applications are incorporated herein by reference in their entireties.

BACKGROUND OF THE INVENTION

1. Field of the Invention

The present invention relates to removing blocking artifacts and ringing noise, and more particularly, to a filtering method and apparatus for removing blocking artifacts and ringing noise caused when processing an image frame on a block-by-block basis.

2. Description of the Related Art

In general, video data is encoded by processing image frames in block units. In particular, according to video data encoding standards such as the moving picture experts group standard (MPEG) and H.263, video data is encoded by performing a discrete cosine transform (DCT) and quantization on image frames in block units. However, encoding image frames in block units may result in blocking artifacts and ringing noise. Blocking artifacts make an edge region, which was not in the original frame, occur in a reproduced image frame, thereby causing discontinuity between adjacent pixels of the edge region in the reproduced image frame. Also, when ringing noise occurs in an image frame, a borderline of an object in the image frame is not smoothly depicted, e.g., the borderline may be irregular. The higher a compression rate of the reproduced image frame, the more serious the blocking artifacts and the ringing noise become.

To filter the blocking artifacts and the ringing noise, it is important to first find an exact region of the image frame in which the blocking artifacts and ringing noise occur. Otherwise, an edge region present in the original image frame may be mistakenly regarded as being generated due to the blocking artifacts and removed, thereby deteriorating the quality of the image.

In general, detection of an edge region of a pixel block reproduced due to blocking artifacts and/or ringing noise is required to accomplish a conventional filtering method for removing blocking artifacts and/or ringing noise. For instance, in a reproduced image frame consisting of a plurality of 8×8 or 4×4 pixel blocks, the distribution of pixel values, such as brightness, luminance, and color of pixels present on boundaries between the 8×8 or 4×4 pixel blocks are measured and the measured values are compared with a predetermined critical value. The critical value is experimentally obtained by measuring the distribution of the above pixel values, such as brightness, luminance, and color of pixels, finding a relationship between the distributions of the above pixel values, and determining whether the edge region is present or not in an image frame.

To measure the distribution of pixel values, pixel values in a boundary region between adjacent blocks must be checked in the vertical or horizontal direction. However, in fact, it is almost impossible to check every pixel value in the boundary region because of a large amount of calculation and complexity. In particular, since pixel values are stored in a memory device in the vertical direction in chronological order, continuous access to the memory device is required to calculate pixel values in the vertical direction. However, continuous access to a memory device is, at least for the time being, out of the question.

SUMMARY OF THE INVENTION

The present invention provides a filtering method and apparatus for effectively detecting an edge region present in a pixel block.

The present invention also provides a filtering method and apparatus for effectively detecting an edge region present in a pixel block with a small amount of calculation.

According to an aspect of the present invention, there is provided a filtering method for removing blocking artifacts, including (a) transforming video data on a block-by-block basis; and (b) detecting the presence of an edge region in the video data by checking the distribution of values obtained by the transformation.

According to another aspect of the present invention, there is provided a filtering method for removing blocking artifacts, including (a) transforming and quantizing video data on a block-by-block basis; (b) creating filter information based on the distribution of values obtained by the transformation and quantization; and (c) filtering the video data based on the filter information.

Preferably, (a) includes (a1) performing DCT on the video data on a block-by-block basis to obtain DCT coefficients; and (a2) quantizing the DCT coefficients. More preferably, (a) includes performing DCT and quantization on a 4×4 pixel block to obtain a 4×4 quantized DCT block.

Preferably, (b) includes creating filter information indicating the degree of the occurrence of blocking artifacts and/or ringing noise based on the quantized DCT coefficients. More preferably, (b) comprises (b1) creating filter information by checking the values of pixels not corresponding to a DC component, in the uppermost row of the quantized DCT block, where the filter information indicates whether an edge region is present in a vertical direction of the original pixel block.

Preferably, (b) also comprises (b2) creating filter information by checking the values of pixels not corresponding to the DC component, in the leftmost column of the quantized DCT block, where the filter information indicates whether an edge region is present in a horizontal direction of the original pixel block. Otherwise, (b) may comprise (b3) creating filter information by checking the values of pixels not in the uppermost row and leftmost column of the quantized DCT block, where the filter information indicates whether an edge region is present in a diagonal direction of the original pixel block.

Preferably, (b) comprises setting a vertical blocking flag (VBF) and a horizontal blocking flag (HBF) to 1 as the filter information when only the pixel A has a value other than 0. Preferably, (c) comprises deblocking filtering more strongly in the horizontal and vertical directions of the pixel block if the HBF and VBF are set to 1, respectively.

Preferably, (b) comprises setting the VBF to 1 as the filter information when only the pixels A and B have values other than 0, and (c) comprises deblocking filtering more strongly in the vertical direction of the pixel block when the VBF is set to 1.

Preferably, (b) comprises setting the HBF to 1 as the filter information when only the pixels A and C have values other than 0, and (c) comprises deblocking filtering more strongly in the horizontal direction of the pixel block when the HBF is set to 1.

Preferably, a ringing flag (RF) is set to 1 when the pixels A, B, and C have values other than 0, and (c) comprises deringing filtering more strongly when the RF is set to 1.

According to still another aspect of the present invention, there is provided a filtering method for removing blocking artifacts, including (a) transforming and quantizing a block consisting of video data in pixel units so as to obtain quantized values, checking the obtained quantized values, and creating filter information when the checked result is for filter information; and (b) performing filtering based on the created filter information.

Preferably, (a) comprises (a1) performing DCT and quantization on one of pixels not corresponding to a DC component, in the uppermost row and leftmost column of the block to obtain a quantized DCT coefficient; and (a2) checking the quantized DCT coefficient, creating filter information based on the checked result when the quantized DCT coefficient is a value other than 0, and terminating performing DCT and quantization on the pixels in the uppermost row and leftmost column.

(a) comprises (a3) checking the quantized DCT coefficient, and performing DCT and quantization on one of pixels not corresponding to the DC component, in the uppermost row and leftmost column when the quantized DCT coefficient is 0; (a4) repeatedly performing (a2) and (a3) on the remaining pixels not corresponding to the DC component and the one pixel, in the uppermost row and leftmost column so as to obtain quantized DCT coefficients; and (a5) creating filter information when the quantized DCT coefficients for all of the pixels in the uppermost row and leftmost column are 0.

According to still another aspect of the present invention, there is provided an encoder for encoding video data, comprising a loop filter wherein the loop filter comprises: a filter information producing unit which creates filter information based on the distribution of values obtained by transforming and quantizing a pixel block; a filter characteristics decision unit which determines filter characteristics based on the created filter information; and a deblocking filter which deblocking filters based on the determined filter characteristics.

Preferably, the loop filter further comprises a loop transforming unit which transforms pixel values for inter frame on a block-by-block basis, and a loop quantizing unit which quantizes values transformed by the loop transforming unit.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

For a better understanding of the present invention, the concept of encoding video data will be briefly described before describing preferred embodiments of the invention with reference to the accompanying drawings.

In general, video data consists of a plurality of image frames. Image frames are encoded into an intra frame and an inter frame and then transmitted. The intra frame is encoded with no reference to other images and can be independently decoded. Meanwhile, the inter frame is encoded based on a previous or next image, that is, a difference between the inter frame and the previous or next frame, and therefore, decoding of the inter frame requires the previous or next frame. Each image frame consists of a plurality of macro blocks, and each macro block contains a plurality of pixel blocks.

In a filtering method and an encoding apparatus for performing the method according to the present invention, an edge region is detected by transforming a macro block or a pixel block and checking the distribution of obtained transform values and/or values obtained by quantizing the transform values. A filtering method and an encoding apparatus for performing the method will now be described.

Figure 1:
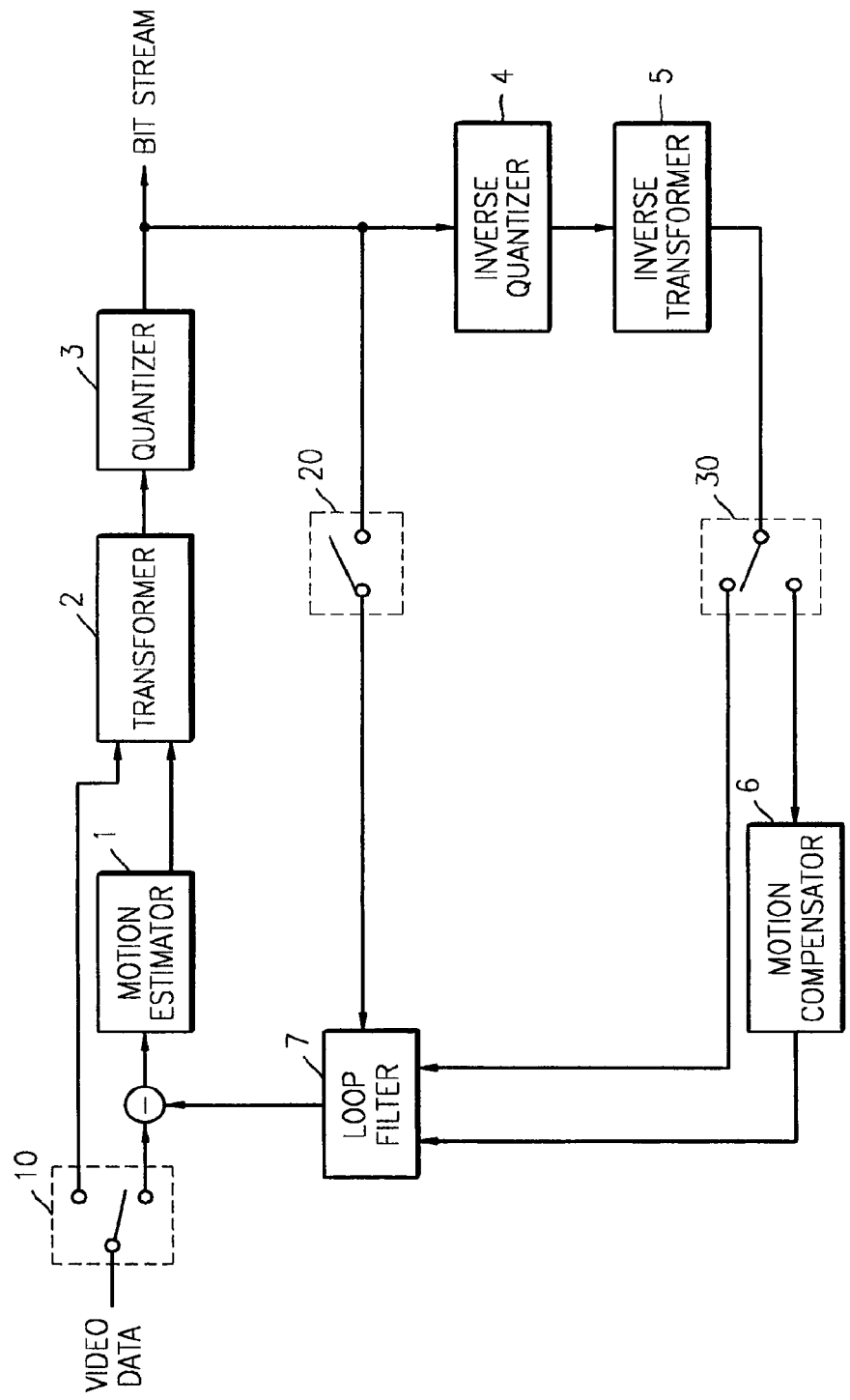
FIG. 1 is a block diagram of an encoding apparatus according to the present invention.

FIG. 1 is a block diagram of an encoding apparatus according to a preferred embodiment of the present invention. Referring to FIG. 1, the encoding apparatus includes a motion estimator 1, a transformer 2, a quantizer 3, an inverse quantizer 4, an inverse transformer 5, a motion compensator 6, and a loop filter 7. The encoding apparatus further includes a controller (not shown), a first switch 10, a second switch 20, and a third switch 30, with all switches being controlled by the controller.

When video data is input to the controller, the controller controls the first switch 10 such that an intra frame and an inter frame are input directly to the transformer 2 and the motion estimator 1, respectively. The motion estimator 1 compares a pixel value with a previous pixel value in pixel block units and outputs a difference, i.e., motion vector, between the pixel value and the previous pixel value, to the transformer 2. The transformer 2 changes the descriptive manner of data, i.e., transforms, for pixel values present in an image frame in case of the intra frame, and the difference, i.e., motion vector, in case of the inter frame. In this embodiment of the present invention, discrete cosine transform (DCT) is performed to transform image frames but any applicable method such as a discrete wavelet transform (DWT) may be used instead of the DCT. The quantizer 3 quantizes the transformed values, i.e., DCT coefficients, according to predetermined quantization step. The quantization step may be determined adaptively to the respective block unit. However, the larger the size of the quantization step, the more noise due to quantization of values increases. Values, which are obtained by performing the DCT and quantization on an image frame, are coded using variable-length coding (VLC), for example, and transmitted to a receiving end.

Meanwhile, the values, which are obtained by the DCT and quantization, are input to the inverse quantizer 4 or the loop filter 7. Also, the controller controls the second switch 20 to input intra frames to the loop filter 7 and inter frames only to the inverse quantizer 4. More specifically, in case of intra frames, values output from the quantizer 3 are required to detect an edge region, that is, values obtained by performing the DCT and quantization on pixels in block units. Therefore, the values can be input directly to the loop filter 7 without being additionally processed. In case of inter frames, values output from the quantizer 3 are obtained by performing the DCT and quantization on differences (motion vectors) between the inter frames and their previous frames. Thus, the values are input to the inverse quantizer 4 whose output is input to the inverse transformer 5, to perform inverse quantization and IDCT on pixels on a block-by-block basis, which is a process of restoring pixel values in block units.

The inverse quantizer 4 inversely quantizes the given pixel values according to a predetermined quantization step, and the inverse transformer 5 inversely transforms the inversely quantized values. More specifically, in this embodiment, the inverse transformer 5 performs inverse discrete cosine transform (IDCT) on the inversely quantized values. However, in case that the transformer 2 adopts a transform method other than the DCT, the inverse transformer 5 performs the inverse transform based on the transform method, instead of IDCT. For instance, if the transformer 2 is set to perform discrete wavelet transform (DWT) on pixel values, the inverse transformer 5 performs inverse DWT (IDWT) thereon. Intra frames output from the inverse transformer 5 are pixel values to be filtered, i.e., pixel values of a current image frame, and thus are input to the loop filter 7. Inter frames need to be compensated for their motion to obtain pixel values for the current image frame, and thus inter frames are input to the motion compensator 6. Next, the controller controls the third switch 30 to input the intra frames output from the inverse transformer 5 to the loop filter 7 and input the inter frames output from the inverse transformer 5 to the motion compensator 6. Then, the motion compensator 6 adds the differences between the inter frames and a previous image frame to the previous image frame in block units, restores the current image frame, and outputs the result to the loop filter 7.

The loop filter 7 filters image frames according to the present invention. According to a first embodiment of the present invention, the loop filter 7 checks the distribution of values obtained by performing DCT and quantization thereon to determine whether an edge region is present in an image frame, and filters the image frame according to the checked result. According to a second embodiment of the present invention, the loop filter 7 checks values obtained by performing DCT and quantization on pixel values in the leftmost column and uppermost row, respectively, so as to determine whether an edge region is present in an image frame. Next, the loop filter filters the image frame according to the checked result. A detailed description of the operations of the loop filter 7 will be described later.

Figure 2:
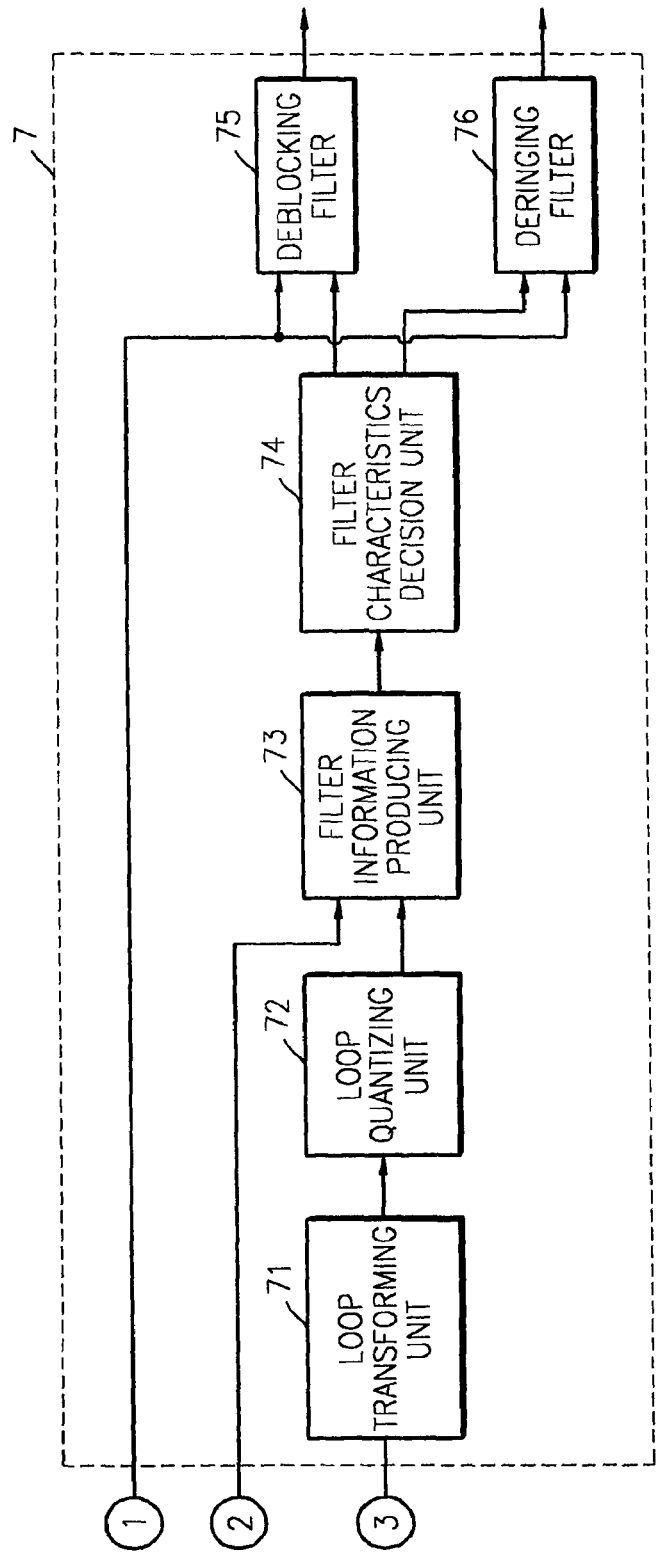
FIG. 2 is a block diagram of a loop filter according to a first embodiment of the present invention.

FIG. 2 is a block diagram of the loop filter 7 according to the first embodiment of the present invention. Referring to FIG. 2, the loop filter 7 includes a loop transforming unit 71, a loop quantizing unit 72, a filter information producing unit 73, a filter characteristics decision unit 74, a deblocking filter 75, and a deringing filter 76.

There are two types of data input to the loop filter 7: (i) object data ① to be filtered; and (ii) filter information extraction data ② and ③ to be used to produce filter information. The object data ① refers to pixel values of image frames in block units. The object data ① of an intra frame is transmitted to the loop filter 7 via the third switch 30, and that of an inter frame is input from the motion compensator 6 to the loop filter 7. In the first embodiment, the filter information extraction data ② and ③ refer to values obtained by performing DCT and quantization on pixel values of a certain block. The filter information extraction data ② of an intra frame refers to values obtained by performing DCT and quantization on pixel values on a certain block and is transmitted directly to the loop filter 7 via the second switch 20 so as to create filter information without an additional calculation process. However, the filter information extraction data ③ of an inter frame is input to the loop filter 7 from the motion compensator 6 and thus must be transformed and quantized within the loop filter 7. For this reason, values input via the second switch 20, i.e., the filter information extraction data ② of an intra frame, are input to the filter information producing unit 73, and the values input from the motion compensator 6, i.e., the filter information extraction data ③ of an inter frame, are input to the loop transforming unit 71.

The loop transforming unit 71 and the loop quantizing unit 72 transforms and quantizes pixel values on a block-by-block basis for an inter frame, respectively. The loop transforming unit 71 and the loop quantizing unit 72 have the same functions, i.e., transformation and quantization, as the transformer 2 and the quantizer 3 shown in FIG. 1. However, the transformation and quantization of the loop transforming unit 71 and the loop quantizing unit 72 do not need the same precision as the transformer 2 and the quantizer 3. This is because values produced by the loop transforming unit 71 and the loop quantizing unit 72 are used to only detect the occurrence of an edge region, and thus may have lower precision than those obtained by the transformer 2 and the quantizer 3 to encode video data. Accordingly, the loop transforming unit 71 and the loop quantizing unit 72 may lower precision in DCT and quantization by using integral operation instead of decimal operation, increasing the size of quantization step, or performing a fast-mode DCT, thereby reducing the amount of calculation. For instance, a simplified quantization algorithm performed by the loop quantizing unit 72 is as follows:

$$\text{LEVEL} = (K \times A(QP) + f \times 2^{20})/2^{20},$$

wherein LEVEL denotes a quantized value, K denotes a quantized pixel value on which DCT is performed, A(QP) denotes a constant from a mapping table, and f is a constant determined depending on a target compression efficiency. The quantized value is set to 1 if $K < (2^{20} - f \times 2^{20})/A(QP)$, and is set to another predetermined value otherwise.

The filtering information producing unit 73 creates filter information with values obtained by performing DCT and quantization on pixel values on a block-by-block basis. A detailed description of the operation of the filtering information producing unit 73 will be described later. The filter characteristics decision unit 74 determines and outputs filter characteristics based on the filter information. The deblocking filter 75 and the deringing filter 76 perform filtering on video data according to the determined filter characteristics.

Figures 3, 4:
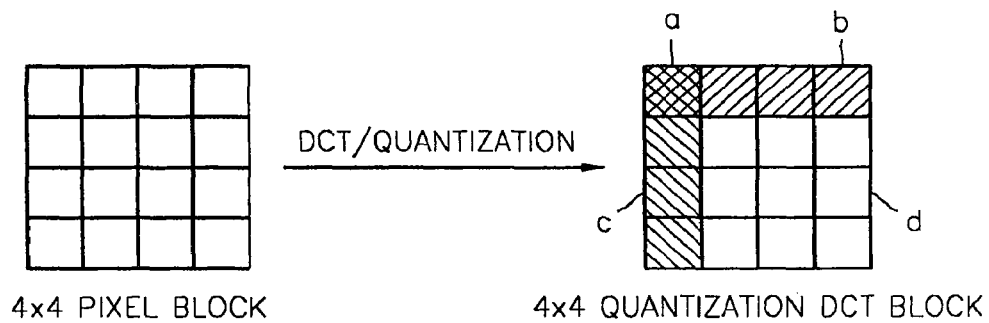
FIGS. 3 and 4 are diagrams illustrating a method for producing filter information using a filter information producing unit according to a first embodiment of the present invention.

FIGS. 3 and 4 are diagrams illustrating a method for creating filter information using the filter information producing unit 3 of FIG. 1, according to a first embodiment of the present invention. Referring to FIG. 3, DCT and quantization are performed on a 4×4 pixel block, which is a basic unit in the first embodiment, to obtain a 4×4 quantized DCT block (hereinafter, 'DCT block'). In the DCT block, a denotes a DC component pixel, b denotes pixels other than pixel a, in the uppermost row of the DCT block that indicate whether an edge region is present in the vertical direction of the DCT block, c denotes pixels other than pixel a, in the leftmost column of the DCT block that indicate whether an edge region is present in the horizontal direction of the DCT block, and d denotes pixels other than pixels a through c in the leftmost column and uppermost row of the DCT block, which indicate the occurrence of ringing noise in a diagonal direction of the DCT block.

In conclusion, filter information is created using the values of pixels A through C, according to a preferred embodiment of the present invention, shown in FIG. 4. The presence or degree of blocking artifacts is determined by checking the values of the pixels A, B, and C and filter information is created according to the checked result, as follows:

(1) In the case where only pixel A has a value other than 0:

That is, if the pixels B and C are set to 0, all pixels of a pixel block, which is to be reproduced at a receiving site, have the same values. In this case, there is very little probability that an edge region is present in the horizontal and vertical directions of the original pixel block. Therefore, if an edge region is present in a reproduced pixel block, it is regarded as being due to blocking artifacts, and thus, a horizontal vertical blocking flag (HBF) and a vertical blocking flag (VBF) are set to 1 as filter information.

(2) In the case where only the pixels A and B have a value other than 0:

In this case, pixels in the vertical direction of a pixel block reproduced at a receiving site, have the same value within a predetermined range. This means there is a probability that an edge region is present in the horizontal direction of the original pixel block but there is very little probability that an edge region is present in the vertical direction of the original pixel block. That is, an edge region is present only in the vertical direction of the reproduced pixel block, which is considered as being due to the blocking artifacts. Therefore, the VBF is set to 1 as filter information.

(3) In the case where only the pixels A and C have a value other than 0:

In this case, pixels in the horizontal direction of a pixel block reproduced at a receiving site, have the same values within a predetermined range. This means there is a probability that an edge region is present in the vertical direction of the original pixel block but there is very little possibility that an edge region is present in the horizontal direction thereof. Therefore, if an edge region is present in the horizontal direction of the reproduced pixel block, it is regarded as being due to the blocking artifacts. In this case, the HBF is set to 1 as filter information.

(4) In the case where pixels other than pixels A, B, and C, have a value other than 0:

If pixels in the rows and columns but not in the row where pixels A and B belong, and the column to which the pixels A and C belong, have a value other than 0, a ringing flag RF is set to 1 as filter information. This means a ringing noise occurs in a reproduced pixel block.

When the HBF and/or the VBF, and the RF are transmitted to the filter characteristics decision unit 74, the filter characteristics decision unit 74 determines filter characteristics based on these flags. In other words, if the HBF is determined, the deblocking filter 75 is set to perform filtering more strongly in the horizontal direction of a pixel block. If the VBF is determined, the deblocking filter 75 is set to perform filtering more strongly in the vertical direction of the pixel block. If the RF is set, the deringing filter 76 is set to perform filtering more strongly in the pixel block. Accordingly, it is possible to perform adaptive filtering on video data according to the degree of blocking artifacts and/or ringing noise.

In the first embodiment, filter information is created using the values of the pixels A, B, and C to remove blocking artifacts. Alternatively, it is possible to create filter information while skipping the step of checking at least one of the values of the pixels in the uppermost and leftmost columns according to the specifications of an application relating to precision and rapidity.

Figure 5:
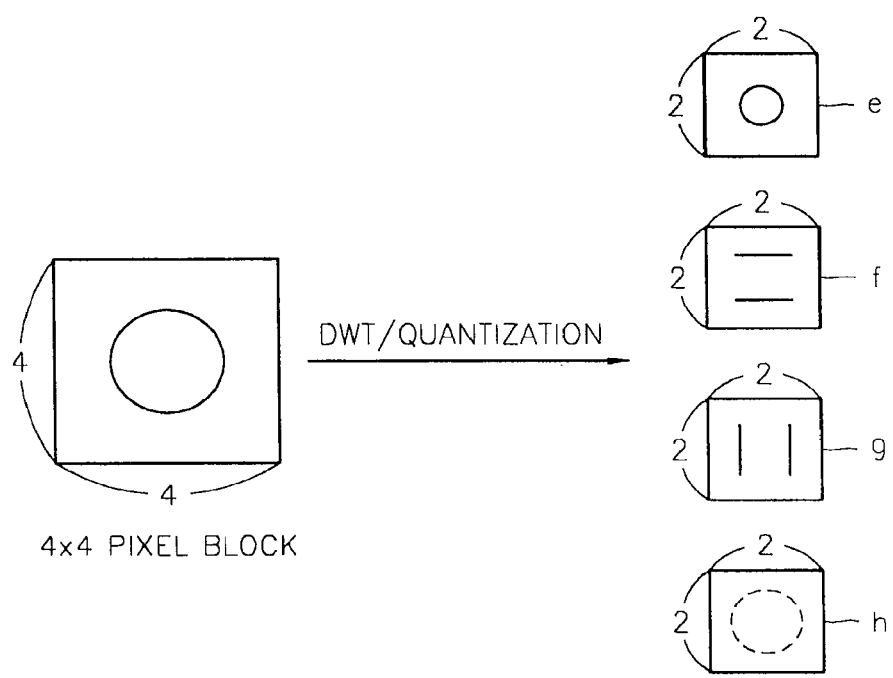
FIG. 5 is a diagram illustrating filter information produced according to a modified one of the first embodiment of the present invention.

FIG. 5 is a diagram illustrating filter information produced according to a modified example of the first embodiment of the present invention. Here, a loop filter 7 of FIG. 2 is used. However, the modified example of the first embodiment is different from the first embodiment in that discrete wavelet transform (DWT), instead of DCT, is performed on image frames.

Referring to FIG. 5, DWT and quantization are performed on a 4×4 pixel block to obtain four 2×2 quantized DWT blocks e through h. The block e is obtained by passing the 4×4 DCT block, of FIG. 4, through a low-pass filter and corresponds to the DC component, i.e., pixel A, of the 4×4 quantized DCT block. The block f corresponds to the pixel B of the 4×4 quantized DCT block, i.e., it indicates whether an edge region is present in a horizontal direction of the original pixel block. The block g corresponds to the pixel C of the 4×4 quantized DCT block, i.e., it indicates whether an edge region is present in a vertical direction of the original pixel block. The block h corresponds to other pixels not on the uppermost and leftmost columns of the block to which the pixels A and B, and pixels A and C belong, of the 4×4 quantized DCT block. The block h indicates whether ringing noise occurs in the original pixel block.

In the first embodiment, filter information is created using the values of the pixels A, B, and C. Similarly, in the modified example of the first embodiment, filter information indicating the occurrence of blocking artifacts and/or ringing noise is also created using the blocks e, f, g, and h.

A filtering method according to the first embodiment of the present invention will now be described.

Figure 6:
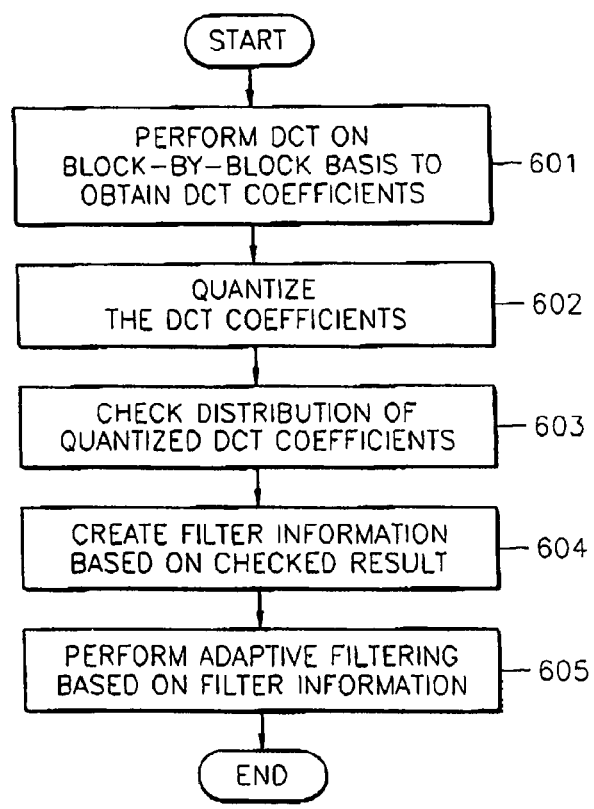
FIG. 6 is a flow chart illustrating a filtering method according to a first embodiment of the present invention.

FIG. 6 is a flow chart illustrating a filtering method according to a first embodiment of the present invention. Referring to FIG. 6, an encoder performs DCT on input video data on a block-by-block basis in step 601 to obtain DCT coefficients. Next, the DCT coefficients are quantized according to a predetermined quantization step to obtain a quantized DCT block in step 602. After step 602, the encoder checks the distribution of values of pixels of the quantized DCT block in step 603, and creates filter information based on the checked result in step 604. With the filter information, it is possible to detect the degree of blocking artifacts and/or ringing noise. After step 604, the encoder determines filter characteristics based on the created filter information and performs adaptive filtering on the input video data in step 605.

Figure 7:
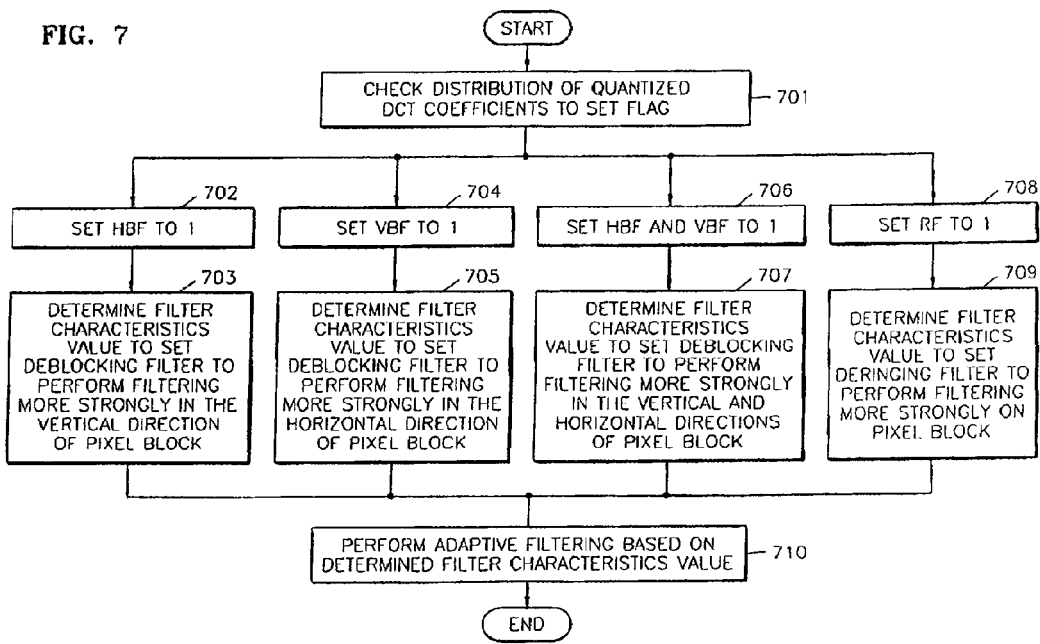
FIG. 7 is a flow chart illustrating another filtering method according to the first embodiment of the present invention.

FIG. 7 is a flow chart illustrating another filtering method according to the first embodiment of the present invention. Referring to FIGS. 2 and 7, in step 701, the filter information producing unit 73 checks the distribution of values of pixels of a quantized DCT block, and sets a horizontal blocking flag HBF, a vertical blocking flag VBF, or a ringing flag RF to 1 or 0. If the HBF is set to 1 in step 702, the filter characteristics decision unit 74 determines filter characteristics such that the deblocking filter 75 performs filtering more strongly in the vertical direction of the DCT block, in step 703. If the VBF is set to 1 in step 704, the filter characteristics decision unit 74 determines and outputs filter characteristics such that the deblocking filter 75 performs filtering more strongly in the horizontal direction of the DCT block, in step 705. If the HBF and the VBF are set to 1 in step 706, the filter characteristics decision unit 74 determines filter characteristics such that the deblocking filter 75 performs filtering more strongly in the vertical and horizontal directions of the DCT block, in step 707. If the RF is set to 1 in step 708, the filter characteristics decision unit 74 determines filter characteristics such that the deringing filter 76 performs filtering more strongly on the DCT block, in step 709. Thereafter, the deblocking filter 75 and the deringing filter 76 perform adaptive filtering on input video data according to the set filter characteristics, in step 710.

Deblocking filtering is performed on a block-by-block basis, but video data is in fact input to the encoder together with pixel values at border regions of blocks adjacent to a current block as well as the current block. The input pixel values are filtered by the deblocking filter 75 and outputs as changed values. For instance, adjacent values 3 through 6 are changed when pixel values 1 through 4 of the current block and pixel values 5 through 8 of the adjacent block are more strongly filtered by the deblocking filter 75, and only the values 4 and 5 are changed otherwise. Accordingly, a flag of an adjacent block is compared with that of a current block to adjust the characteristics value of the deblocking filter 75. That is, the filter characteristics value of the deblocking filter 75 is set to a strong value if the flag of the adjacent block is the same as that of the current block and set to a weak value otherwise.

Alternatively, the filter information producing unit 73 may compare the flags VBF, HBF, and RF of the adjacent blocks with the flags VBF, HBF, and RF of the current block, and create filter information based on the compared result. As a result, the created filter information can be more accurately expressed than the filter information created using flags of the current block, and thus, filter characteristics values can be more precisely determined.

Figure 8:
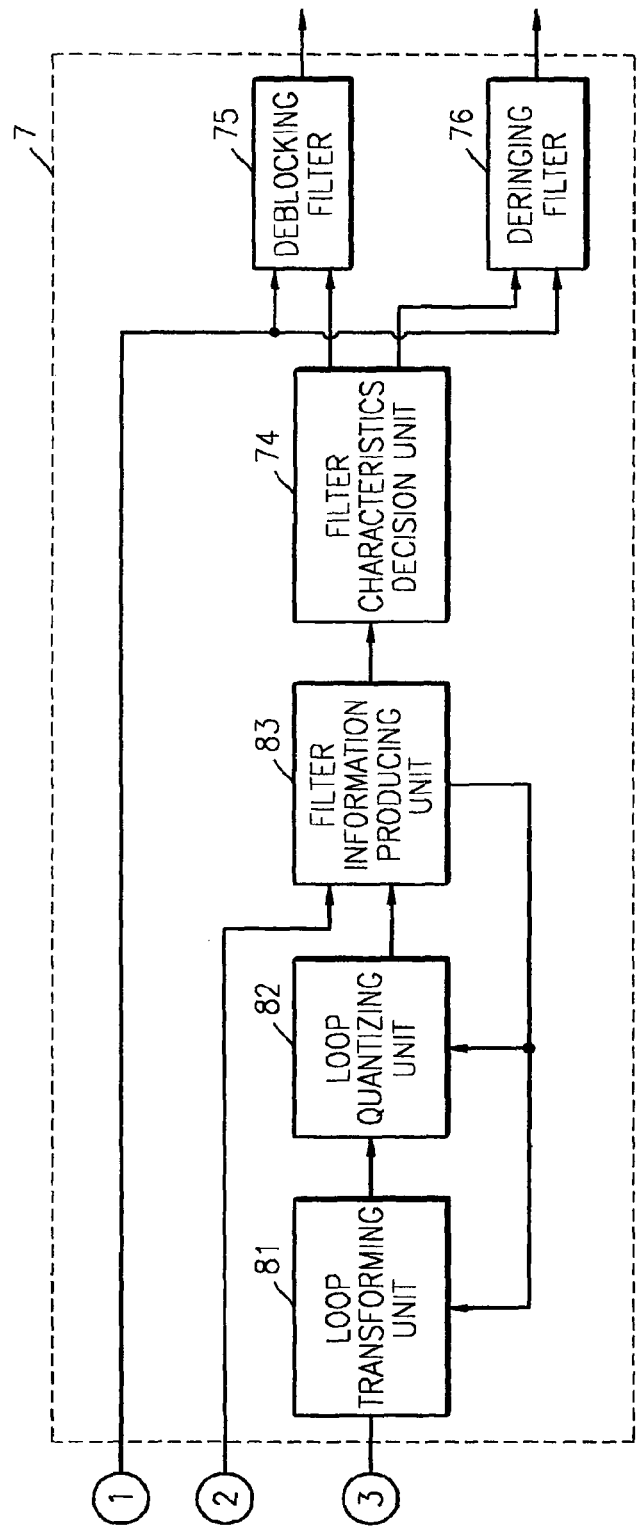
FIG. 8 is a block diagram of a loop filter according to a second embodiment of the present invention.

FIG. 8 is a block diagram of the loop filter 2 according the second embodiment of the present invention. Referring to FIG. 8, the loop filter 7 includes a loop transforming unit 81, a loop quantizing unit 82, a filter information producing unit 83, a filter characteristics decision unit 74, a deblocking filter 75, and a deringing filter 76.

There are two types of data input to the loop filter 7: (i) object data ① to be filtered; and (ii) filter information extraction data ② and ③ to be used to produce filter information. The object data ① refers to pixel values of image frames in block units. The object data ① of an intra frame is transmitted to the loop filter 7 via the third switch 30, and that of an inter frame is input from the motion compensator 6 to the loop filter 7. As in the second embodiment, the filter information extraction data ② and ③ refer to values obtained by performing DCT and quantization on pixel values of a certain block. In case of the filter information extraction data ② of an intra frame refers to values obtained by performing DCT and quantization on pixel values on a certain block and is transmitted directly to the loop filter 7 via the second switch 20 so as to create filter information without an additional calculation process. However, the filter information extraction data ③ of an inter frame is input to the loop filter 7 from the motion compensator 6 and thus must be transformed and quantized within the loop filter 7. For this reason, values input via the second switch 20, i.e., the filter information extraction data ② of an intra frame, are input to the filter information producing unit 83, and the values input from the motion compensator 6, i.e., the filter information extraction data ③ of an inter frame, are input to the loop transforming unit 71.

The loop transforming unit 81 performs DCT or DWT on first and second pixels in the uppermost row and leftmost column of a predetermined sized block of an input inter frame, respectively. In this case, DCT or DWT is performed on the first and second pixels of the leftmost column downward, and performed on the first and second pixels of the uppermost row from the left to the right. The loop quantizing unit 82 quantizes DCT coefficients transformed by the loop transforming unit 81. The DCT and quantization of the loop transforming unit 81 and the loop quantizing unit 82 are the same as the transformer 2 and the quantizer 3 described with reference to FIG. 1. However, the transformation and quantization of the loop transforming unit 81 and the loop quantizing unit 82 do not need the same precision as the transformer 2 and the quantizer 3. This is because values produced by the loop transforming unit 81 and the loop quantizing unit 82 are used to only detect the occurrence of an edge region, and thus may have lower precision than those obtained by the transformer 2 and the quantizer 3 to encode video data. Accordingly, the loop transforming unit 81 and the loop quantizing unit 82 may have lower precision in DCT and quantization by using integral operation instead of decimal operation, increasing the size of quantization step, or performing a fast-mode DCT, thereby reducing the amount of calculation. For instance, an example of a simplified quantization algorithm performed by the loop quantizing unit 82 is as follows:

$$\text{LEVEL} = (K \times A(QP) + f \times 2^{20})/2^{20},$$

wherein LEVEL denotes a quantized value, K denotes a quantized pixel value on which DCT is performed, A(QP) denotes a constant from a mapping table, and f is a constant determined depending on a target compression efficiency. The quantized value is set to 1 if $K < (2^{20} - f \times 2^{20})/A(QP)$, and is set to another predetermined value otherwise.

The filter information producing unit 83 checks if the first and second pixels in each of the leftmost and uppermost rows, on which DCT (or DWT) and quantization are performed, have values other than 0. If the DCT (or DWT) or quantized second pixel value in the leftmost or uppermost row is 0, the filter information producing unit 83 instructs the loop transforming unit 81 and the loop quantizing unit 82 to perform DCT (or DWT) on and quantize a next pixel, respectively. The filter information producing unit 83 receives a value of the next pixel and checks if the value is 0 and repeats the aforementioned operation.

If the value which is obtained by performing DCT (or DWT) or quantizing the second pixel value in the leftmost or uppermost row is a value other than 0, the filter information producing unit 83 creates filter information based on the result. A method for creating filter information is as described in the first embodiment. Next, the filter information producing unit 83 instructs the loop transforming unit 81 and the loop quantizing unit 82 to stop performing DCT (or DWT) and quantizing a pixel value, respectively. In other words, if the value is not 0, DCT (or DWT) and quantization of pixel values in the leftmost column or uppermost row are terminated (a detailed description thereof will be later described). The filter characteristics decision unit 74 determines and outputs filter characteristics based on the filter information. The deblocking filter 75 and the deringing filter 76 perform filtering according to the determined filter characteristics. The operations of the filter characteristics decision unit 74, the deblocking filter 75, and the deringing filter 76 are the same as those of the filter characteristics decision unit 74, the deblocking filter 75, and the deringing filter 76 according to the first embodiment. Therefore, their descriptions will be omitted here.

Figure 9:
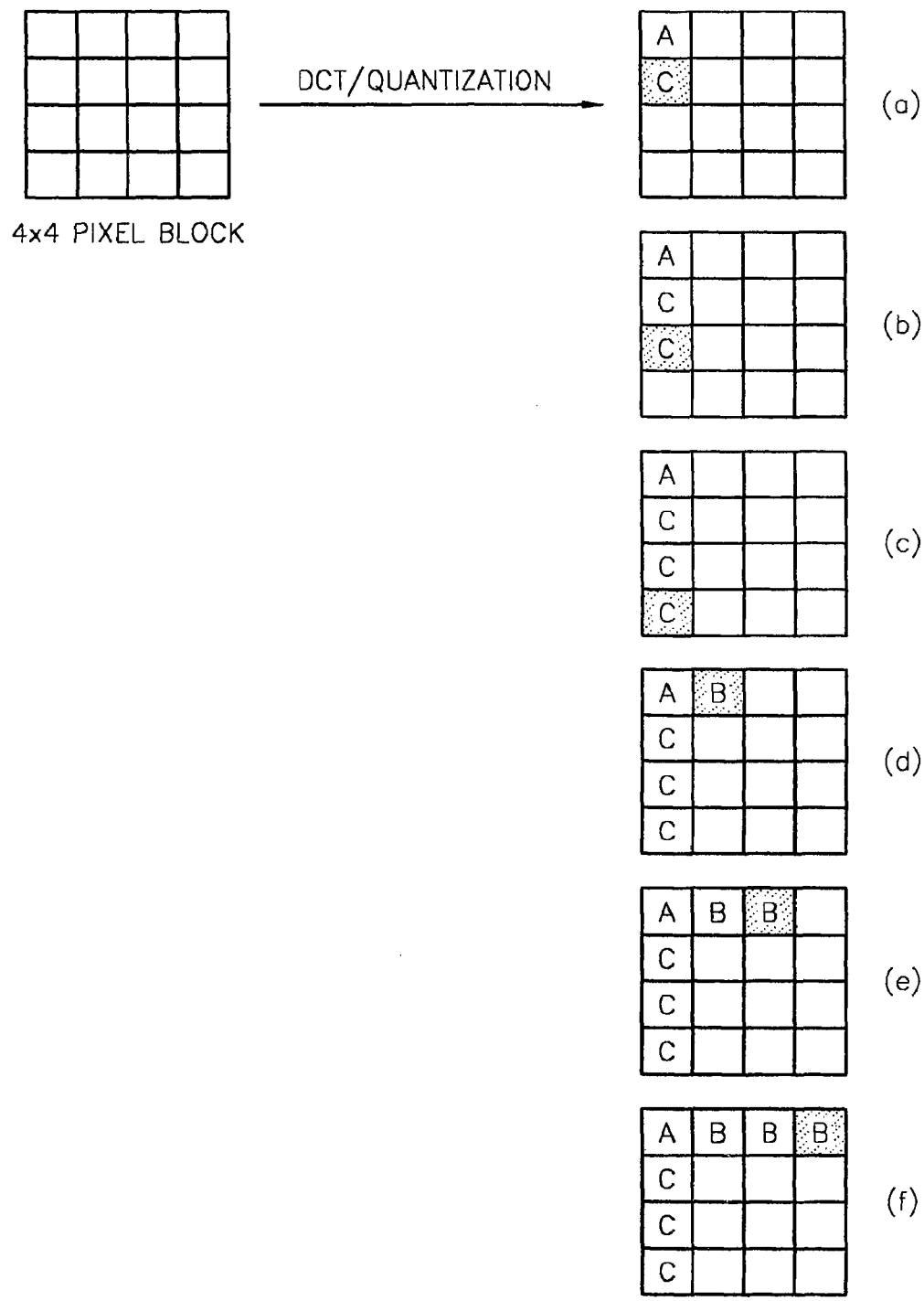
FIG. 9 is a diagram illustrating a method for obtaining filter information extraction data using a filter information producing unit, and a method for producing filter information based on the obtained filter information extraction data, according to a second embodiment of the present invention.

FIG. 9 is a diagram illustrating a method for obtaining filter information extraction data using the filter information producing unit 83 of FIG. 8 and creating filter information from the filter information extraction data, according to the second embodiment of the present invention. In the filtering method of FIG. 9, DCT and quantization are performed on a first pixel C, which is indicated with dotted lines in (a), adjacent to a DC component A in the leftmost column of a 4×4 pixel block which is a basic unit for filtering in the present invention. Next, a value obtained by DCT and quantization is checked. If the value is not 0, DCT and quantization are terminated and filter information is created based on the checked result. If the value is 0, DCT and quantization are performed on a second pixel C, which is indicated with dotted lines in (b), to obtain other values. If the other value is not 0, DCT and quantization are terminated and filter information is created on the checked result. However, if the other value is 0, DCT and quantization are performed on a third pixel C, which is indicated with dotted lines in (c), and then, it is also checked to still another value obtained by DCT and quantization. Likewise, if the still another value is not 0, DCT and quantization are terminated and filter information is created based on the checked result. If the still another value is 0 and there are no more pixels in the leftmost column, filter information is created based on the results already obtained. Filter information is obtained as described in the method according to the first embodiment of the present invention.

Meanwhile, DCT and quantization are performed on a first pixel B, adjacent to the DC component A, in the uppermost row of the 4×4 pixel block, indicated with dotted lines in (d). Next, it is checked with a value obtained by DCT and quantization. If the value is not 0, DCT and quantization are terminated and filter information is created based on the checked result. If the value is 0, DCT and quantization are performed on a second pixel B, which is indicated with dotted lines in (e), and then, it is checked with other value obtained by DCT and quantization. If the other value is not 0, DCT and quantization are terminated and filter information is created on the checked result. If the other value is 0, DCT and quantization are performed on a third pixel, which is indicated with dotted lines in (f), and it is checked with a still another value. If the still another value is not 0, DCT and quantization are terminated and filter information is created on the checked result. However, if the still another value is 0 and there are no more pixels, in the uppermost row, filter information is created based on the results already obtained. Filter information is created as described in the method according to the first embodiment of the present invention.

Likewise, DCT and quantization are performed on pixels other than A, B, and C of the 4×4 pixel block on a block-by-block basis. Next, a value obtained by DCT and quantization is checked to detect the occurrence of ringing noise. Thereafter, filter information is created based on a criteria for determining the occurrence of ringing noise and the occurrence of the ringing noise. A method for creating filter information is the same as that according to the first embodiment of the present invention.

Figure 10:
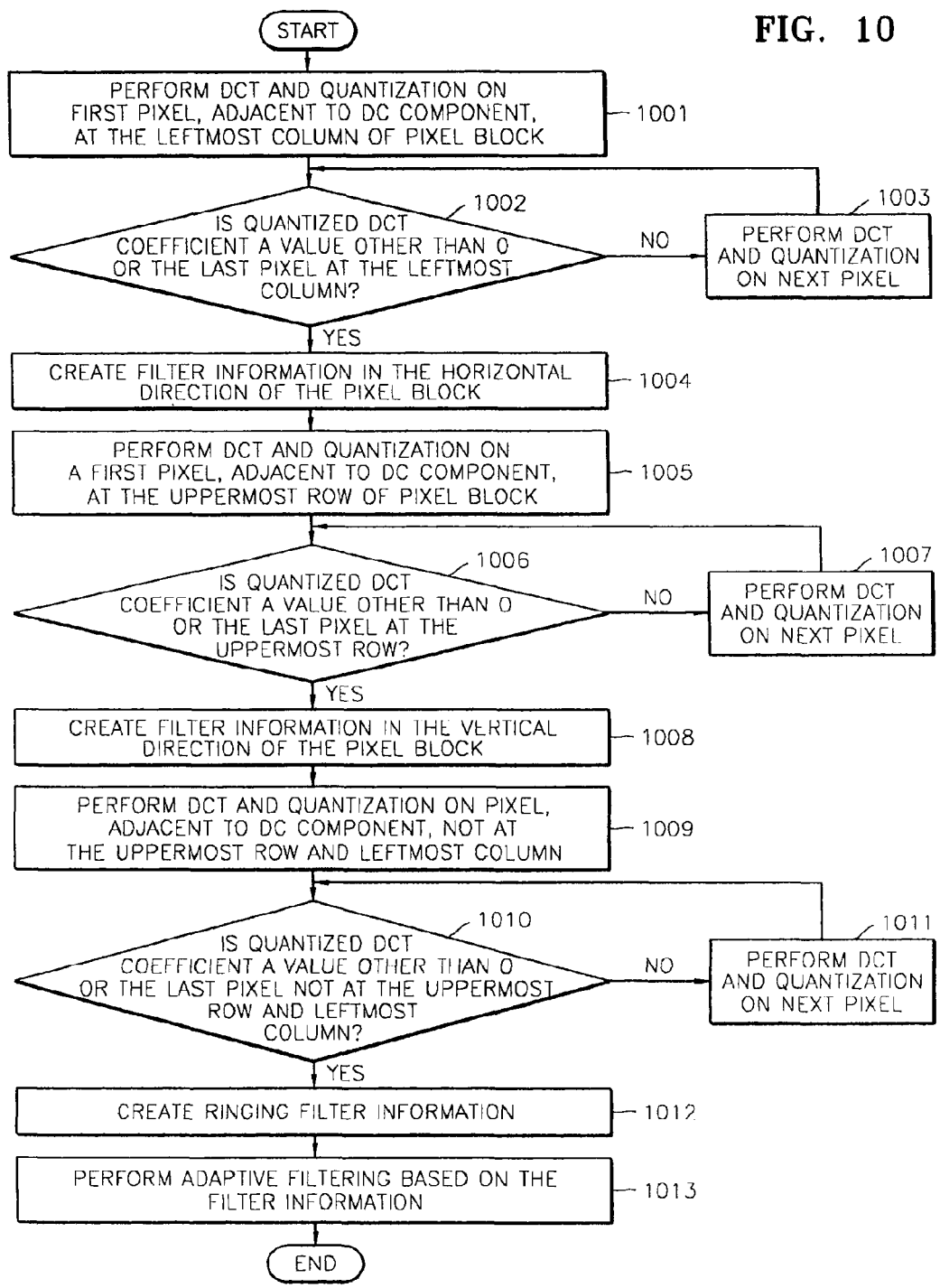
FIG. 10 is a flow chart illustrating a filtering method according to a second embodiment of the present invention.

FIG. 10 is a flow chart illustrating a filtering method according to the second embodiment of the present invention. Referring to FIG. 10, DCT and quantization are performed on a first pixel, adjacent to a DC component, in the leftmost column of a 4×4 pixel block, in order to calculate a quantized DCT coefficient, in step 1001. After step 1001, the calculated quantized DCT coefficient is checked in step 1002. If the quantized DCT coefficient is 0, DCT and quantization are performed on a next pixel in step 1003, and it proceeds to step 1002.

However, if the quantized DCT coefficient is a value other than 0 or a related pixel is the last pixel in the leftmost column, DCT and quantization are terminated and filter information is created on the results already obtained, in step 1004. That is, when any pixel in the leftmost column has a quantized DCT coefficient other than 0, horizontal blocking flag (HBF) is set to 1 as filter information.

After step 1004, DCT is performed on a first pixel, adjacent to the DC component, in the uppermost row, and an obtained DCT coefficient is quantized to calculate a quantized DCT coefficient, in step 1005. Next, the calculated quantized DCT coefficient is checked in step 1006. If the quantized DCT coefficient is 0, DCT and quantization are performed on a next pixel in step 1007, and it proceeds to step 1006.

When the quantized DCT coefficient is a value other than 0 or a related pixel is the last one in the uppermost row, DCT and quantization are terminated and filter information is created based on the results already obtained, in step 1008. In other words, if any pixel in the uppermost row has a quantized DCT coefficient other than 0, a vertical blocking flag (VBF) is set to 1 as filter information.

After step 1008, DCT and quantization are performed on a pixel adjacent to the DC component, not in the uppermost row and leftmost column, in step 1009. Next, an obtained quantized DCT coefficient is checked in step 1010. If the quantized DCT coefficient is 0, DCT and quantization are performed on a next pixel in step 1011, and it proceeds to step 1010.

When the quantized DCT coefficient is a value other than 0 or a related pixel is the last one not in the leftmost column and uppermost row, DCT and quantization are terminated and filter information is created on results already obtained in step 1012. That is, if any pixel, not in the leftmost column and uppermost row, has a quantized DCT coefficient other than 0, a ringing flag (RF) is set to 1 as filter information.

After step 1012, filter characteristics are determined based on the filter information, and adaptive filtering is performed, in step 1013. A method for making the filter characteristics is as described with reference to FIG. 7. That is, when the HBF is set to 1, the filter characteristics decision unit 74 of FIG. 2 or 8 determines the filter characteristics such that the deblocking filter 75 of FIG. 2 or 8 performs filtering more strongly in a vertical direction of a pixel block. When the VBF is set to 1, the filter characteristics are determined such that the deblocking filter 75 performs filtering more strongly in the vertical direction of a 4×4 pixel block. In case where both the HBF and VBF are set to 1, the filter characteristics decision unit 74 determines and outputs the filter characteristics such that the deblocking filter 75 performs filtering more strongly in the vertical and horizontal directions of the 4×4 pixel block. If the RF is set to 1, the filter characteristics are determined such that the deringing filter 76 of FIG. 2 or 8 performs filtering more strongly on the 4×4 pixel block. Then, the deblocking filter 75 and the deringing filter 76 perform adaptive filtering according to the set filter characteristics.

Deblocking filtering is performed on a block-by-block basis, but video data is in fact input to an encoder, together with pixel values at border regions of blocks adjacent to a current block as well as the current block. The input pixel values are filtered by the deblocking filter 75 and outputs as changed values. For instance, pixel values 3 through 6 are changed when pixel values 1 through 4 of the current block and pixel values 5 through 8 of an adjacent block are more strongly filtered by the deblocking filter 75. However, if these pixel values are weakly filtered by the deblocking filter 75, only the values 4 and 5 are changed. Accordingly, a flag of an adjacent block is compared with that of a current block in order to adjust the filter characteristics of the deblocking filter 75. That is, the filter characteristics value of the deblocking filter 75 is set to a strong value when the flag of the adjacent block is the same as that of the current block and is set to a weak value otherwise, thereby obtaining relatively accurate filter characteristics values.

Alternatively, the filter information producing unit 73 may compare the flags VBF, HBF, and RF of the adjacent blocks with the flags VBF, HBF, and RF of the current block, and create filter information based on the comparison result. As a result, the created filter information can be expressed with more accurate values than the filter information consisting of flags of the current block. In this case, filter characteristics values can be more precisely determined.

In the filtering method of FIG. 10 according to the second embodiment, DCT and quantization are first performed on a plurality of pixels not corresponding to the DC component, in the leftmost column of a pixel block; a plurality of pixels not corresponding to the DC component, in the uppermost row; and a pixel, not in the uppermost row and leftmost column, adjacent to the DC component. However, alternatively, DCT and quantization may first be performed on one of the above pluralities of pixels.

In comparison with the method according to the first embodiment, DCT and quantization are performed in units of pixels in the method according to the second embodiment, thereby reducing the amount of calculation. Also, DWT, instead of DCT, may be performed on pixels in the method according to the second embodiment, as like in the method according to the first embodiment.

Meanwhile, a loop filter of an encoder is used in performing the filtering method in the first and second embodiments. However, the filtering method may be implemented as a post filter in a decoder.

An example of a source code representing a filtering method according to the present invention is as follows:

```
Info[0] = WEAK;
if( (RF of current block == 0) && (RF of left block == 0) ) {
    if( HBF of current block == 1 ) Info[0] = STRONG;
    else Info[0] = WEAK;
    if( HBF of left block == 1 ) Info[1] = STRONG;
    else Info[1] = WEAK;
    if( HBF of left block == 1 ) Info[1] = STRONG;
    else Info[1] = WEAK;
}
Let PtrImage[0] be the left-top pixel of current 4×4 block and width
be the picture width.
if (Info[0] == STRONG && Info[1] == STRONG) {
    for(m=0; m<4; m++) {
        o[0]=PtrImg[-4]; o[1]=PtrImg[-3]; o[2]=PtrImg[-2]; o[3]=
```

```
        PtrImg[-1];
        o[4]=PtrImg[0]; o[5]=PtrImg[1]; o[6]=PtrImg[2]; o[7]=PtrImg[3];
        PtrImg[-2] = (o[0]+2*o[1]+2*o[2]+2*o[3]+o[4]+4)/8;
        PtrImg[-1] = (o[1]+2*o[2]+2*o[3]+2*o[4]+o[5]+4)/8;
        PtrImg[0] = (o[2]+2*o[3]+2*o[4]+2*o[5]+o[6]+4)/8;
        PtrImg[1] = (o[3]+2*o[4]+2*o[5]+2*o[6]+o[7]+4)/8;
```

According to the above source code, it is possible to check if an edge region is present in a block and more precisely detect the presence of an edge region in a block by a comparison of filter information between adjacent blocks.

While the present invention has been particularly shown and described with reference to preferred embodiments thereof, it will be understood by those skilled in the art that various changes in form and details may be made therein without departing from the spirit and scope of the invention as defined by the appended claims.

As described above, in a filtering method and apparatus according to the present invention, blocking artifacts and/or ringing noise can be removed by more effectively detecting an edge region.

What is claimed is:

1. A filtering method for removing blocking artifacts, comprising:
    obtaining filter information based on quantized transform values obtained by transforming and quantizing video data based on a block-by-block basis;
    determining a strength of filtering for a current block from among a plurality of strengths of filtering based on information on the current block and at least one neighboring block of the current block; and
    performing deblocking filtering on the video data to remove at least one of artifact and noise from the video data, based on the determined strength of filtering,
    wherein the deblocking filtering obtains motion-compensated pixel values of the current block and outputs filtered pixel values for a predetermined-number of pixel values among the obtained motion-compensated pixel values based on the determined strength of filtering, and
    the obtaining the filtering information and the performing the deblocking filtering are performed on a loop filter located in a feedback path of a filtering apparatus to use the filtered pixel values for encoding a next block.

2. The filtering method of claim 1, wherein the strength of filtering indicates the number of pixels to be filtered in the current block and the neighboring block.

3. The filtering method of claim 1, wherein the obtaining filter information comprises obtaining a filter information by checking quantized transform values in at least one of DC component, an uppermost row and leftmost column of a quantized transform block.

* * * * *